US007657885B2

(12) United States Patent
Anderson (10) Patent No.: US 7,657,885 B2
(45) Date of Patent: Feb. 2, 2010

(54) SYSTEM AND METHOD FOR DOWNLOADING SOFTWARE AND SERVICES

(75) Inventor: Glen Anderson, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 455 days.

(21) Appl. No.: 10/826,718

(22) Filed: Apr. 16, 2004

(65) Prior Publication Data

US 2005/0235282 A1    Oct. 20, 2005

(51) Int. Cl.
*G06F 9/44* (2006.01)
(52) U.S. Cl. .................. 717/170; 717/169; 717/175; 705/59; 705/67
(58) Field of Classification Search ......... 717/168–178; 705/59, 67
See application file for complete search history.

(56) References Cited

U.S. PATENT DOCUMENTS

| | | | | |
|---|---|---|---|---|
| 6,151,643 A | * | 11/2000 | Cheng et al. ............ | 710/36 |
| 6,470,496 B1 | * | 10/2002 | Kato et al. .............. | 717/173 |
| 6,542,943 B2 | * | 4/2003 | Cheng et al. ............ | 710/36 |
| 6,553,375 B1 | * | 4/2003 | Huang et al. ............ | 707/10 |
| 6,621,896 B1 | | 9/2003 | Rinn | |
| 7,051,211 B1 | * | 5/2006 | Matyas et al. ........... | 713/187 |
| 7,143,408 B2 | * | 11/2006 | Anderson et al. ........ | 717/175 |
| 7,316,013 B2 | * | 1/2008 | Kawano et al. .......... | 717/168 |
| 7,345,232 B2 | * | 3/2008 | Toivonen et al. ........ | 84/615 |
| 2001/0047514 A1 | * | 11/2001 | Goto et al. ............. | 717/11 |
| 2002/0120725 A1 | * | 8/2002 | DaCosta et al. ......... | 709/221 |
| 2002/0169849 A1 | * | 11/2002 | Schroath ............... | 709/218 |
| 2004/0054597 A1 | * | 3/2004 | Gulliver et al. ......... | 705/26 |

* cited by examiner

*Primary Examiner*—Wei Zhen
*Assistant Examiner*—Phillip H Nguyen
(74) *Attorney, Agent, or Firm*—Pearne & Gordon LLP (57) ABSTRACT

A system and method for downloading substantially up to date versions of selected software from a plurality of software vendors over a network and for installing the software to a hardware unit includes a first software handling machine in the network configured to execute a download manager that sends a download transaction request including an identifier associated with the selected software over the network, and downloads and installs the selected software pursuant to a download/installation instruction, and also includes a second software handling machine in the network configured to execute a download supervisor to determine whether the requested download transaction is authorized, and, if so, to communicate a download/installation instruction to the download manager to enable it to download and install the selected software.

37 Claims, 5 Drawing Sheets

SYSTEM AND METHOD FOR DOWNLOADING SOFTWARE AND SERVICES

TECHNICAL FIELD

The present invention relates in general to software download systems, and more particularly, to a system and method for downloading software from a plurality of software vendor download servers.

BACKGROUND

Multi-purpose or general purpose software handling machines such as personal computers (PCs), multimedia centers, personal digital assistants and the like, typically run software that has been obtained from many different software vendors. For example, a PC may be loaded and configured with an operating system distributed by one software vendor, a virus scanner distributed by another, and specialized applications and data distributed by still other software vendors. Likewise, services provided by a number of different vendors may also be enabled and configured on software handling systems.

As used herein, the term "software vendor" includes any entity that provides software or services, whether the software is licensed or sold, or distributed for free or is provided incidental to a service. The term "software," as used herein, includes computer instructions, data, or any other information that can be stored electronically, including media such as music, images, video, and the like, and specifically includes services.

Software is often revised to add features and capabilities, to effect service changes and to fix problems that have been discovered. These revisions are released from time to time and are made available in a variety of patches, updates, and product releases which typically can be downloaded from software vendor download servers such as Internet Websites. The revisions may be provided for free or may be sold. Unfortunately, the burden is frequently placed on software installers and users to ensure that the most up to date versions have been downloaded and installed.

The tasks of monitoring, locating, and gathering up-to-date software from a plurality of vendors can complicate the set up of software handling machines. For example, the vast majority of new PCs are sold or "bundled" together with a number of software products and services each of which may be provided by a different software vendor. The ever increasing number of software vendors has made it more and more difficult for PC vendors to monitor, track down, and obtain the latest software releases for their customers. In some cases these versions may even be impossible to provide. For example, some software vendors require customers to register their products in an on-line interactive session before granting access to fully enabled and up-to-date software products. Users can be irritated and confused by the need for such interactive sessions and may be reluctant to provide personal information to a plurality of software vendors. PC vendors typically bear the brunt of this frustration and thus continually seek ways to deliver new systems that are better configured and ready to use "out of the box."

Software downloads and installations are further complicated by the growing number of security keys and codes needed for authentication/authorization processes involved in product activation, installation and download of revisions. Authentication keys, which are often provided on software product packaging, can all too easily become misplaced, depriving users of software revisions to which they are entitled and further decreasing customer satisfaction.

All of the aforementioned problems, and many others, impede the efficient set up and maintenance of PCs and other software handling machines. Embodiments of the present invention address the foregoing problems by providing a system and method for managing the download and installation of software from a plurality of software vendors.

SUMMARY

In general, in one aspect, a method for downloading substantially up to date versions of selected software from a plurality of software vendors over a network and for installing the software to a hardware unit, in which the network includes a first software handling machine configured to execute a download manager, a second software handling machine configured to execute a download supervisor and a plurality of download servers for downloading software from the plurality of vendors, includes associating a transaction identifier with selection data including a software selection, sending a download transaction request including the transaction identifier from the download manager to the download supervisor, determining, by the download supervisor, whether the requested download transaction is authorized, assembling, by the download supervisor, a download/installation instruction including substantially up-to-date software access information for the software selection, if the transaction is determined to be authorized, communicating the download/installation instruction from the download supervisor to the download manager, and performing a download and installation of the software selection to the hardware unit by the download manager pursuant to the download/installation instruction.

In general, in another aspect, a system for downloading software to a hardware unit from a plurality of vendors over a network includes a plurality of download servers in the network for downloading software from the plurality of software vendors, a first software handling machine in the network and also linked to the hardware unit, the first software handling machine configured to execute a download manager, the download manager adapted to initiate a download/installation transaction including selected software to be downloaded to the hardware unit from one or more of the plurality of download servers, the download manager adapted to send a transaction identifier in a download transaction request to a download supervisor over the network, and to download and install the selected software to the hardware unit pursuant to a download/installation instruction received in response to the download transaction request. The system also includes a second software handling machine in the network configured to execute the download supervisor, the download supervisor adapted to determine whether the download transaction request is authorized, and, if the transaction is determined to be authorized, to assemble a download/installation instruction including substantially up-to-date software access information for the software selection and to send the download/installation instruction to the download manager.

In general, in yet another aspect, a hardware unit configured to execute a download manager capable of downloading and installing selected software from a plurality of software vendors from a plurality of download servers in a network includes means to initiate the download manager during a boot sequence of the hardware unit, means to provide a transaction identifier to a download supervisor in the network to enable the download supervisor to identify and validate the download transaction, means to receive a communication from the download supervisor including a download/installation instruction that includes substantially up-to-date software access information for the selected software of the download transaction, and means to perform the download and installation of the selected software to the hardware unit according to the download/installation instruction.

In general, in yet another aspect, a program includes a storage medium tangibly embodying program instructions for downloading and installing software to a hardware unit from a plurality of software vendors over a network. The program instructions include instructions operable to cause at least one programmable processor to provide a download manager executable on a first software handling machine in the network, the download manager adapted to initiate a download/installation transaction including selected software to be downloaded to the hardware unit from one or more of a plurality of download servers in the network, to provide a transaction identifier to identify and validate the download transaction and to perform a download and an installation of selected software to the hardware unit pursuant to a download/installation instruction. The program instructions also include instructions operable to cause at least one programmable processor to provide a download supervisor executable on a second software handling machine in the network, the download supervisor adapted to evaluate data including the transaction identifier to determine whether the download transaction is authorized and, if the transaction is authorized, to communicate a download/installation instruction including substantially up-to-date software access information for the selected software from the download supervisor to the download manager, and associate the transaction identifier with the selected software for a download transaction. The program instructions also include instructions operable to cause at least one programmable processor to send a download transaction request including the transaction identifier over the network from the download manager to the download supervisor. The program instructions also include instructions operable to cause at least one programmable processor to perform the download and installation of software to the hardware unit by the download manager pursuant to the download/installation instruction.

BRIEF DESCRIPTION OF THE DRAWINGS

The numerous advantages of the present invention may be better understood by those skilled in the art by reference to the accompanying figures in which like reference numerals designate corresponding parts in the various figures, and in which.

DETAILED DESCRIPTION

In the following detailed description, reference is made to the accompanying drawings that form a part hereof, and in which are shown by way of illustration specific preferred embodiments in which the invention, as claimed, may be practiced. The invention may, however, be embodied in many different forms and should not be construed as limited to the embodiments set forth; rather, these embodiments are provided so that this disclosure will be thorough and complete, and will fully convey the scope of the invention to those skilled in the art. As will be appreciated by those of skill in the art, the present invention may be embodied in a variety of methods and devices. Embodiments of the present invention may be implemented on a variety of software and hardware platforms and are not limited to any particular type of hardware or software component or system.

Figure 1:
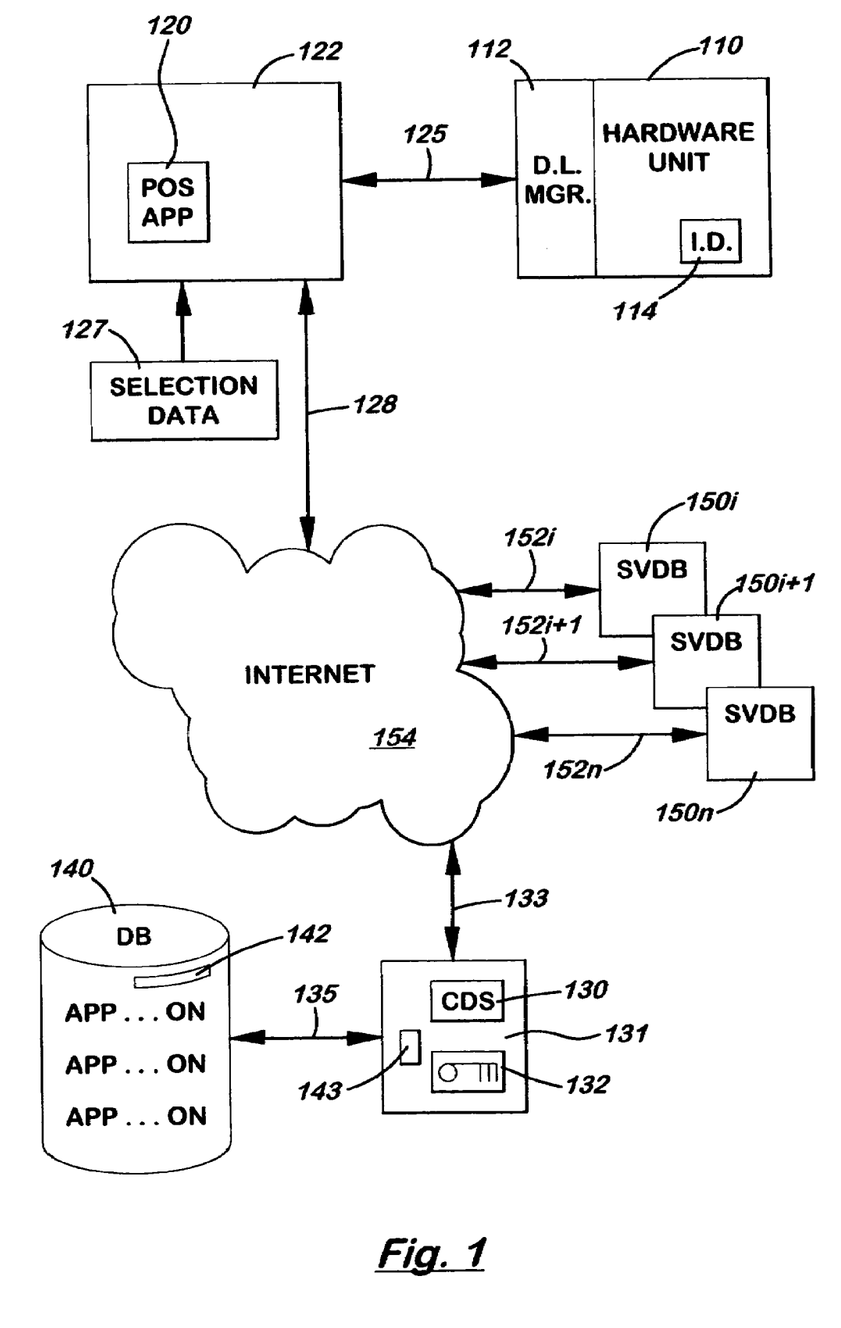
FIG. 1 is an illustration of a system for providing software in accordance with one embodiment of the present invention.

FIG. 1 shows a simplified representative architecture of a system 100 according to the preferred embodiment of the present invention. System 100 may be used to configure a hardware unit 110 for an efficient, automated download and installation of the latest available versions of selected software from a plurality of software vendors with little or no mandatory user interaction. In some embodiments, the download and installation may be performed as part of a vendor configuration or set up of hardware unit 110, such as at a hardware vendor point of sale or distribution, or at a hardware vendor assembly facility (POS). In other embodiments, the download and installation may be performed at some later time, such as when hardware unit 110 is first set up by an end user. Embodiments of systems according to the present invention may or may not be bundled with the purchase of a hardware unit and may be purchased at a point of sale location, or by telephone or mail order, or through a Web-based application.

Hardware unit 110 may be a software handling machine that includes a software storage component such as a hard drive, flash memory, or other mass storage unit, or may be a software storage component intended for installation in a software handling machine. Hardware unit 110 may also be a stand alone computer system such as a PC, a media center, or a portable electronic device such as handheld computer, cellular telephone, or another software handling machine capable of storing and executing software that has been obtained from a plurality of software vendors. Hardware unit 110 may be directly connected to the internet (or another wide area network), or may be connected through at least one other software handling machine, such as a server.

Figure 2:
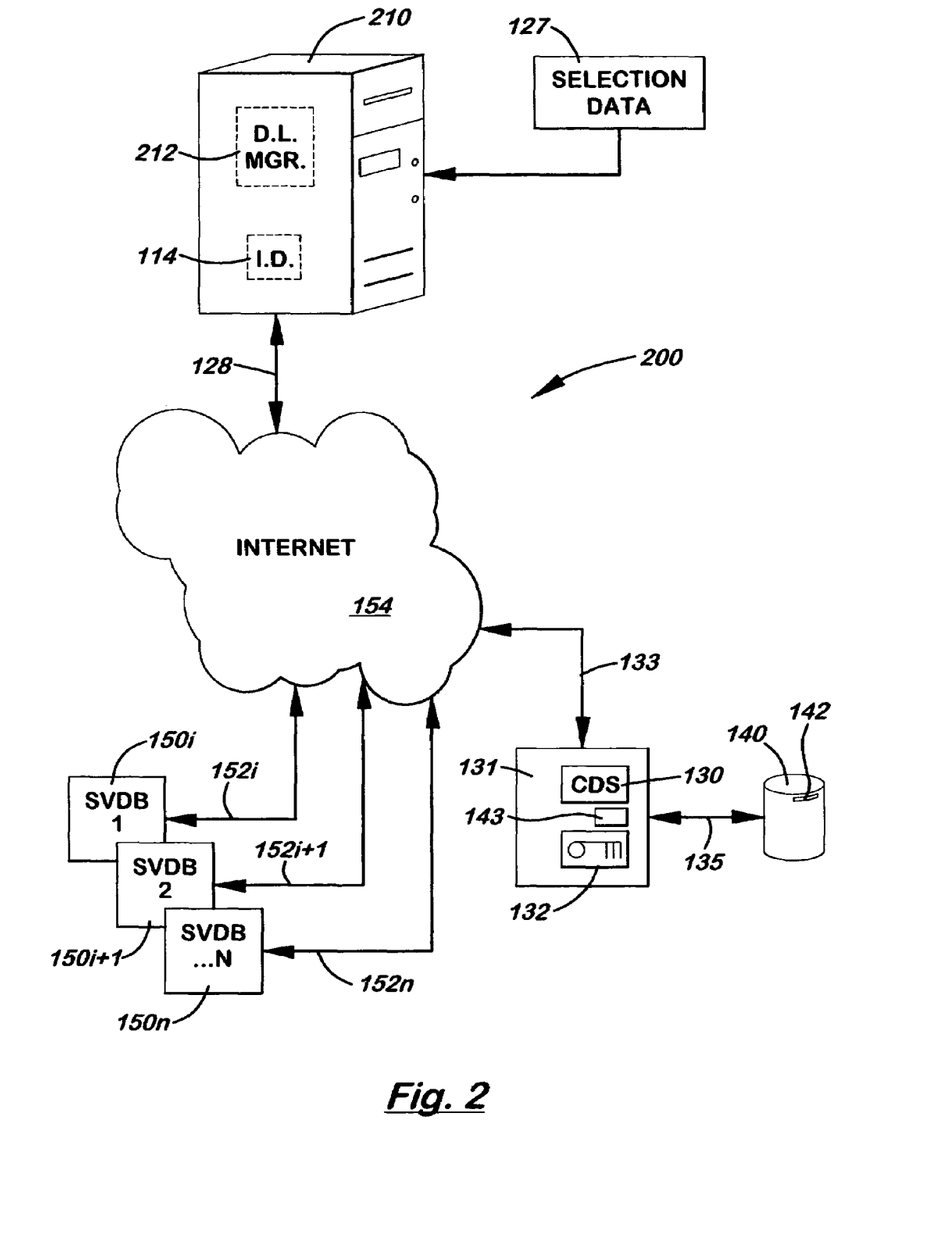
FIG. 2 is an illustration of a system for providing software in accordance with an alternative embodiment of the present invention.

A download manager 112, 212, 312 (referring to the download managers illustrated in FIGS. 1, 2 and 3, respectively) initiates the process of downloading software from a plurality of software vendors. In embodiments such as illustrated in FIGS. 1 and 2, hardware unit 110, 210 will generally be provided "off the shelf" with a download manager 112, 212. In other embodiments, such as the embodiment illustrated in FIG. 3, download manager 312 will be provided on a computer readable media 310 and be loaded onto a hardware unit 320, such as a PC, by the customer. In general, download manager 112, 212, 312 may be stored in whole or in part on any suitable computer readable storage media, including optical or magnetic discs or other mass storage devices, memory devices such as ROM, EPROM, flash memory, etc., or any combination thereof.

Figure 3:
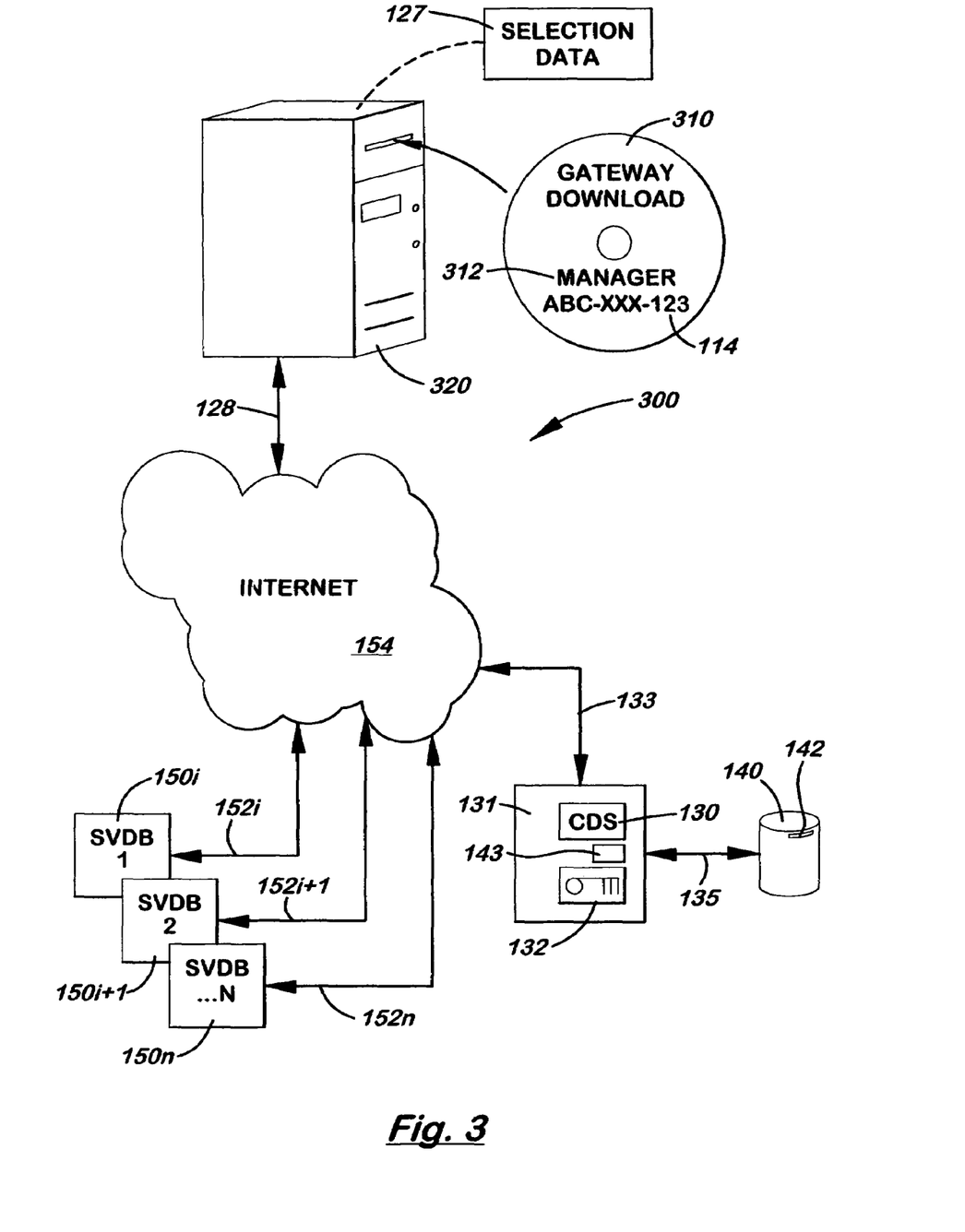
FIG. 3 is an illustration of a system for providing software in accordance with an alternative embodiment of the present invention.

Download manager 112, 212, 312 handles basic connectivity and download functions. In some embodiments, download manager 112, 212, 312 will operate as a simple bootstrap loader that establishes basic connectivity and download functions until a more complex program is loaded to which it can hand off control. In other embodiments, download manager 112, 212, 312 may control the download and installation of all software to be added to a hardware unit before relinquishing control.

Download manager 112, 212, 312 is provided with or is equipped to determine or to detect a transaction identifier 114, which may be used to identify and validate the download transaction (DLT) and/or authenticate the download manager 112 to other systems and processes. Transaction identifier 114 may include a serial number, a hardware code, a customer number, a personal identification number or password, an encrypted key, or any combination thereof, and may additionally be combined or encrypted with other codes or processes. More than one transaction identifier 114 may be included in some embodiments.

Transaction identifier 114 may be assigned or bound to a particular hardware unit, may be embedded or encoded in download manager 112, 212, 312 or may be assigned and/or activated at a POS or hardware vendor site according to methods known in the art. In some examples, transaction identifier 114 will not change after it has been activated. In other examples, transaction identifier 114 may be regenerated, activated or deactivated in response to an event such as a security problem, a hardware power down or a reboot of the hardware unit.

Systems according to the present invention are network based and thus will include a number of communications links. As will be appreciated by those of skill in the art, there are many ways to implement communications links between software handling machines and other system components. The term "communications link" as used herein includes any state of the art communications architecture and protocol according to promulgated standards, including, for example, Recommended Standard 232 (RS-232), Universal Serial Bus (USB), Access.bus, IEEE P1394, Apple Desktop Bus (ADB), Concentration Highway Interface (CHI), Fire Wire, Geo Port, or Small Computer Systems Interface (SCSI), as well as optical, infra-red or RF wireless interfaces, including IEEE 802.11(b), 802.11(g), and so on, and further includes industry promulgated architecture standards, including Recommended Standard 232(RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on.

In the embodiment of FIG. 1, download manager 112 may load and execute entirely from hardware unit 110 and communicate over a dedicated communications link 125 such as a high speed external bus to system 122 running POS application 120. Alternatively, download manager 112 may execute on system 122 when hardware unit 110 is detected on communications link 125. In still other embodiments, download manager 112 will initiate on hardware unit 110 but will execute on system 122. Communications link 125 may handle all communications signals and data transfers between hardware unit 110 and other machines of system 100, or may establish initial communications and hand off to a higher speed network communications link (not illustrated in FIG. 1).

POS application 120 may obtain, modify, or determine DLT selection data 127 in an interactive process at the time of sale or shortly thereafter. In general, selection data 127 may include customer information, software selection data (including any services), payment related data, activation data, and the like, which will be associated with the transaction identifier 114. In some embodiments, selection data 127 will be obtained by a sales technician at a POS or hardware vendor site. In other embodiments, selection data 127 may be elicited by a Web-based application that interacts with a customer on line. In still other embodiments, POS application 120 may be configured to automatically detect a connection of a hardware unit 110 over communications link 125 and to initiate a process to gather selection data 127. For example, a POS application 120 might be used to obtain selection data 127 at an automated kiosk at the point of sale where the customer could select from a variety of software (including services) and have the selection data 127 recorded to the hardware unit or to a central database to be accessed later in carrying out a DLT.

In the embodiment illustrated in FIG. 1 selection data 127 and transaction identifier 114 will be transmitted by download manager 112 over communications link 128 to a central download supervisor (CDS) 130 running on a software handling machine 131, typically a server. CDS 130 typically will be accessible to download managers over the internet or through a local area or wide area network, and will be configured to maintain or access a central database 140 of customer/DLT records. The CDS 130 will be further capable of gathering and providing the information needed to activate and otherwise gain access to the selected software. Typically, this data will include software authentication codes and network addresses of download servers. The term "authentication," as used herein, includes authorization, whether or not an authentication takes place.

In the preferred embodiment, authentication codes for a plurality of software vendors will be distributed to systems running download manager 112, 212, 312 at the time they are needed, from a central download supervisor 130. Central download supervisor 130 may include an authentication subsystem 132 that is capable of generating or acquiring the necessary software authentication codes for software from the plurality of software vendors. There are a growing number of authentication systems and it is anticipated that software vendors will employ a variety of authentication and security systems. In general, authentication subsystem 132 will have the capability to generate or acquire any and all authentication codes needed to download, install and activate software for the plurality of software vendors. Those of skill in the art will appreciate that all such authentication systems and mechanisms are within the scope of the invention.

Central database 140 is linked to CDS 130 via a communications link 135. Central database 140 may be maintained at the same location as CDS 130 or be geographically separate and connect over a local area or wide area network. Central database 140 will store a variety of customer records including DLT records, a master customer list and data related to creation of keys for the selected software.

Software vendor download servers $150_i$ to $150_n$ will provide access to the latest versions of software (including new releases, updates, patches and services) from the plurality of software vendors. Preferably, software vendor servers $150_i$ to $150_n$ will be linked to the internet 154, as illustrated by communication links $152_i$ to $152_n$, so that software products may be downloaded over conventional high speed communications channels. CDS 130 will provide download/installation instructions for software downloaded from servers $150_i$ to $150_n$. In some examples, software vendor servers 150 may allow unrestricted software downloads such as by anonymous file transfer protocol (FTP), or another conventional network download protocol, simplifying the download. To the extent necessary, however, CDS 130 will be capable of providing download/installation instructions for software downloads from any servers 150$_i$ to 150$_n$ that require passwords, certificates, authentication codes or security protocols, and the like, to download software.

FIG. 2 shows an alternative embodiment of the overall architecture of a system 200 according to the present invention which manages the download and installation of software from a plurality of software vendors on a software handling machine comprising hardware unit 210 which has been delivered to an end user preloaded with a download manager 212. Preferably, download manager 212 will be preconfigured before delivery to eliminate, or at least minimize the need for customer interaction in downloading and installing the software. However, in some embodiments, the download manager 212 may be configured to gather or modify selection data 127 interactively from a user. Download manager 212 will execute on hardware unit 210 and establish a communications link 128 with CDS 130 over the internet. In other respects, system 200 is similar to system 100.

FIG. 3 shows another alternative embodiment of the overall architecture of a system according to the present invention. System 300 manages the download and installation of software from a plurality of software vendors to a software handling machine but does not necessarily involve the sale of the hardware unit. In this embodiment, a download manager 312, and a transaction identifier 314 are provided on a bootable removable media 310, such as standard optical or magnetic removable disk. Alternatively, download manager 312, and an identifier 314 may be provided on a bootable media 310 such as non-volatile memory device, a USB flash drive, or a smart card, for example, or may be downloaded from a Web site. As in the previous embodiment, the download manager 212 may be configured to gather or modify selection data 127 interactively from a user. Download manager 312 may, in some embodiments, be preconfigured for a download and installation of predetermined software. In other embodiments, selection data 127 will be gathered or modified by the download manager 312 in an interactive process to obtain, for example, customer information, software selection data (including any services), payment related data, activation data, and the like, which will be associated with the transaction identifier 114. Download manager 312 will have the capability to configure system 320 to establish communications with CDS 130 over internet/WAN 154. The download manager 312 may be configured to download and install software to the software handling machine on which it executes or to another software handling machine that is accessible, for example, over a local area network (LAN). In other respects, system 300 is similar to system 100.

In embodiments where software may already be installed to a hardware unit, or hardware resources need to be determined, an automated or user-assisted inventory process may be used to gather information about the preexisting software or hardware resources. Such information may be used to add to or modify the list of software that the download manager will download in a DLT. A variety of applications may be employed to interrogate a computing device to gather information about the software applications that have been loaded or to determine hardware resources. For example, information concerning the software applications that are installed on a computer and certain hardware resources may be ascertained by a platform independent standardized interface such as the Desktop Management Interface (DMI) which may be run locally or from a central computer. The DLT may be modified according to the software or hardware information obtained by the DMI.

Figure 4A:
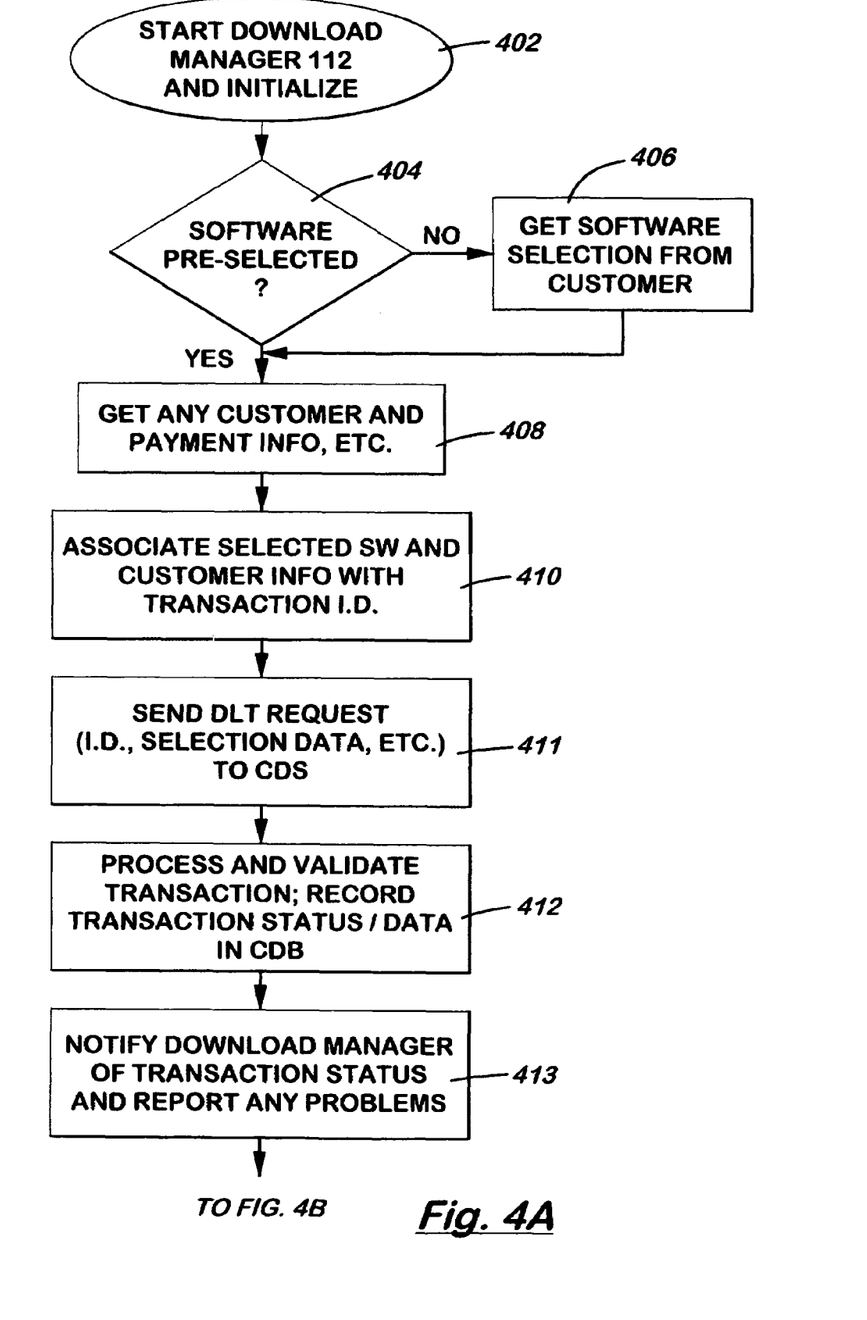
FIGS. 4A and 4B show a simplified flowchart of a method for providing software to a hardware unit in accordance with embodiments of the present invention.
Figure 4B:
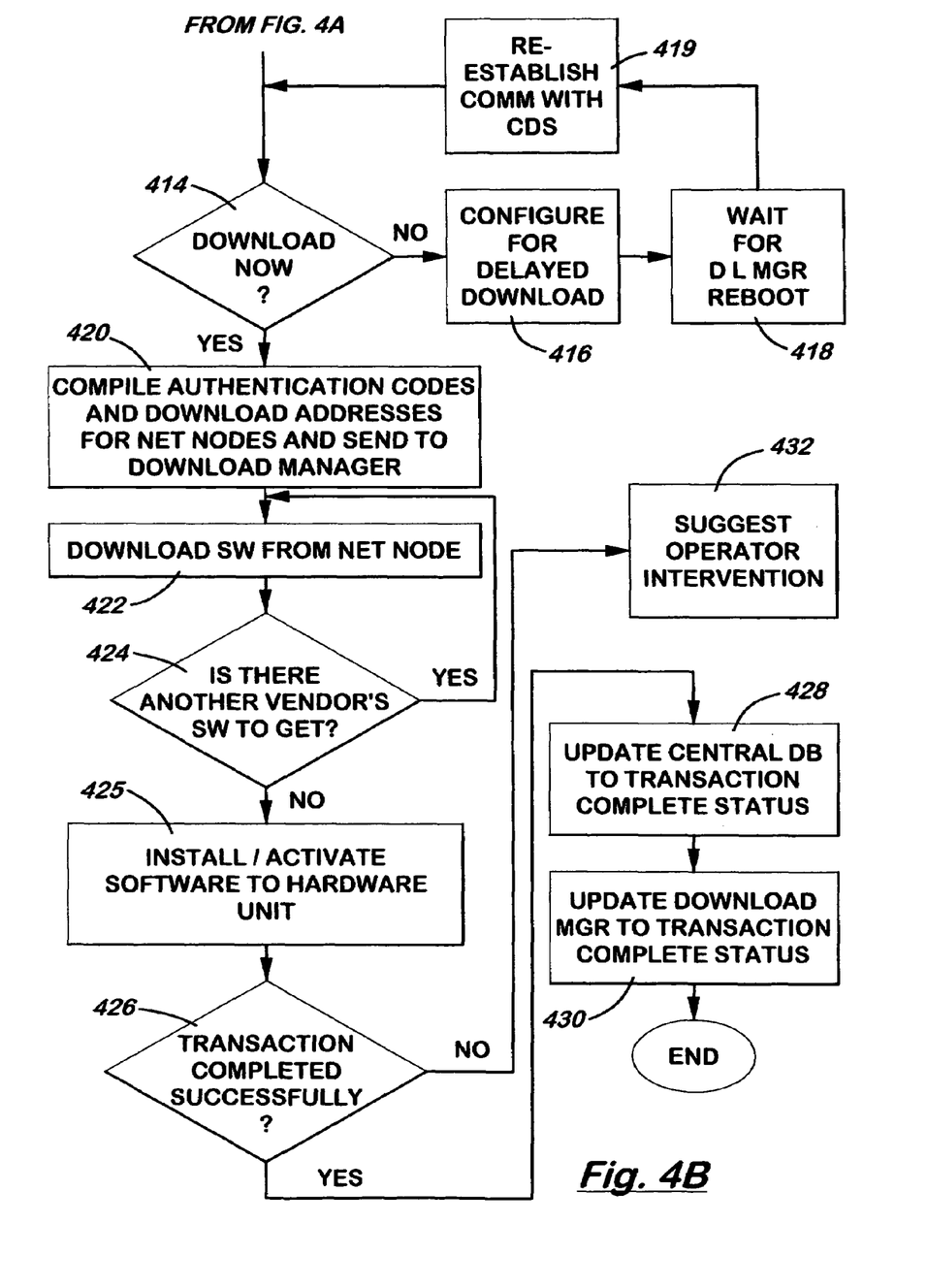

Operation of a preferred embodiment of the present invention will now be described. FIG. 4 is a simplified flowchart of the operation of a system according to the present invention such as the systems illustrated in FIGS. 1-3, for downloading the latest available versions of selected software from a plurality of software vendors over a network and installing the software to a hardware unit. The method begins at block 402 by the starting download manager 112, 212, 312. In some embodiments, as noted, the download manager 112, 212, 312 may be preconfigured to launch automatically from hardware unit 110, 210, 320 during a boot sequence and may execute in whole or in part on the hardware unit. In other embodiments, the download manager may launch and/or execute in whole or in part on a software handling system that is connected by a dedicated communications link to the hardware unit, or is connected via a network link, such as a local area network or the Internet.

When download manager 112, 212, 312 starts up, generally it will perform a series of operations to identify and configure the hardware resources it will need to establish communications with other systems, perform the download, and install the software. A standard platform independent application such as a DMI, as noted above, may be used to detect and configure hardware resources. Other system checks may also be performed by download manager 112, 212, 312 prior to initiating a download. For example, the download manager may check to make sure the selected software would be compatible with the hardware unit and any existing software.

Embodiments of the present invention preferably will minimize or completely avoid the need for user interaction in downloading and installing software. Thus, download manager 112, 212, 312 typically will be preconfigured before delivery to the customer for download and installation of preselected software in a DLT that will normally be performed substantially without user interaction. In one example, preselected software of a certain level or type may be identified on packaging and advertising for a software bundled hardware unit or on shrink wrap packaging for a software product. Alternatively, download manager 112, 212 may be configured by the hardware vendor before delivery to the customer with selection data 127 to provide for a download and installation of custom preselected software. In some other embodiments, download manager 112, 212, 312 may be configured to interact with the user to set or modify software selections (block 404, 406), or to provide or modify other selection data 127 such as customer information, payment information and the like (block 408).

Whenever the required selection data 127 has been obtained for a DLT, the selection data 127 can be associated with transaction identifier 114 (block 410). In general, the association may be recorded on the hardware unit by the download manager 112, 212, 312 or may be recorded remotely, such as in central database 140. For example, transaction identifier 114 may be associated with and used to reference a database transaction record 142 that includes selection data 127. If the required selection data 127 has been gathered at the time of sale, transaction record 142 may be recorded in central database 140 at that time. Likewise, if selection data 127 is incomplete until some later event, such as a first boot of hardware unit 110, 220 or an interactive session with the user, transaction record 142 may be recorded in central database 140 at that time. Preferably a secure network connection such as a secure socket layer (SSL) or other encryption means will be employed in all such communications between the download manager and the download supervisor.

In some embodiments, to allow for circumstances in which communication with CDS 130 is not reliable, the associated selection data 127 and transaction identifier 114 may be stored by the download manager on the hardware unit. The data preferably will be encrypted on the hardware unit and the download manager may be configured to attempt to send the data to CDS 130 at some later time, such as when the hardware unit is set up by the customer.

A DLT request may be sent to CDS 130 (block 411) to set up and configure a DLT for a delayed download or to initiate a download operation immediately. The DLT request will include any selection data 127 and associated transaction identifier 114 that has not already been recorded in a transaction record 142 or may include only the transaction identifier 114 if the transaction record 142 has been created and no data needs to be added or changed.

In response to a DLT request, CDS system 130 will attempt to locate records for the DLT or the customer in central database 140 and will update any records found, or will establish a new DLT transaction record 142. In addition to the necessary selection data 127 and associated transaction identifier 114, a transaction record 142 will generally include data added by the CDS 130, such as date and time stamps, CDS transaction identifiers, I.P. addresses, and error or status messages, etc. CDS 130 may also perform a number of other tasks involved in setting up the DLT such as evaluating selection data 127 and the associated transaction identifier 114 to make sure the transaction is valid and authorized according to its terms, including any customer data, payment information, software selections, and the like (block 412).

After the DLT has been processed by CDS 130 to determine whether it is valid the status will be recorded to transaction record 142 (block 412), and CDS 130 will continue to process the DLT if authorized, or notify the download manager 112, 212, 312 that a problem has been encountered (413). If the transaction is authorized, CDS 130 will query the download manager whether it is ready for the download to commence if that information has not already been provided (block 414), configure for a download to commence immediately or configure for a download later (block 414), as appropriate.

If the download is to be delayed (block 414), CDS 140 will record the DLT status as "hold," and download manager 112, 212, 312 will be configured accordingly (block 416). For example, download manager 112, 212, 312 may be configured to commence a download process automatically at the next boot, or in response to some other event such as a user command (blocks 416, 418). The download manager 112, 212, 312 will then shut down and reestablish communications with the CDS 140 when it is ready to proceed (block 419).

It is anticipated that most software vendors will require authentication codes or keys to download or to activate their products. Authentication codes will vary depending on the software vendor. In general, an authentication code, like a password, includes a series of characters that can be recognized by another system or process to enable access to a file, computer, or program. Authentication codes may also be bound to data identifying the customer, the hardware, and various transaction details such as the date, time, place of sale, hardware vendor, etc., which may be encrypted into the codes according to methods familiar to those of ordinary skill in the art. In some embodiments, the transaction identifier 114 or certain customer identification data may be encrypted into an authentication code. Some other embodiments may encode a current date and/or time into an authentication code. For example, a code may vary periodically, by an algorithm known to authentication subsystem 132 and to the software vendor's authentication system.

Authentication codes may be based on a symmetric cipher i.e., a shared secret or private key in which both the encryption and decryption keys are the same. In other systems, a code will be generated by one process and verified by another without needing to know the original key. For example, various public key/private key asymmetric encryption mechanism such as AES/Rijndael, RSA and Diffie-Hellman, may be employed for verification of authentication codes without knowing the exact original code, as would be familiar to those of skill in the art.

The authentication codes may be single use codes or time-limited, or may be available for repeated future use. Authentication codes may be taken from a list that is provided by the software vendor or may be generated in whole or in part by a cryptographic algorithm in authentication subsystem 132. In still further embodiments, the authentication process may execute on one or more authentication code servers accessed over a secure communications link. The authentication servers may be operated by an independent third part or may be operated by one or more software vendors and may use the methods described herein to generate authentication codes prior to transmission over the secure link.

Varying combinations of encoding methods described above may be used to create authentication codes. For example, the tasks listed above may all be performed resulting in an authentication code that contains transaction identifier 114, and selection data 127 including customer data, and the date/time the authentication code was generated.

In other embodiments, at least part of an authentication code may be determined from a file of authentication codes that may be accessed by CDS 130. The method may begin by determining the current date and/or time. The current date/time value may then be used to perform a lookup of a valid authentication code from an authentication code file. In still other embodiments of the invention, the authentication code file may include a plurality of authentication codes and for each code, a date and/or a time that the authentication code is valid. The system executing the method may scan the file for a date and/or time matching the current date and/or time, and return the corresponding authentication code.

In still other alternative embodiments of the invention, the authentication code file may include a plurality of authentication codes. The date and/or time value may be used as an index to obtain an authentication code. As an example, the authentication code file may contain 365 entries, one for each day of the year. The current day of the year (determined from the current date) may then be used as an index into the file. Those of skill in the art will appreciate that various indexing mechanisms may be substituted and are within the scope of the invention.

When the download manager 112, 212, 312 is ready to perform the download, if the download has been delayed, as noted, it will re-establish communications with CDS system 130 (block 419). CDS system 130 will assemble a download/installation instruction that includes up-to-date software access information 143 for the selected software called for in transaction record 142, including all necessary authentication codes for accessing and/or activating software, network addresses for vendor download servers 150, software version numbers, any data such as checksums that may be available to validate the software, and any installation requirements and set up instructions. CDS 130 may also configure for assisting with and supervising the download. In particular, CDS system 130 preferably will check with software vendors at reasonably frequent intervals to ensure that its database of software access information is up to date, and preferably will verify that the specific software access information 143 for the current DLT is up to date and correct just before the software access information 143 is provided to the download manager in a download/installation instruction.

After assembling and verifying the specific software access information 143 for the current DLT CDS system 130 will send the download/installation instruction to download manager 112, 212, 312 (block 420).

The download manager 112, 212, 312 may then initiate the software download and installation by establishing communications with the SVDB download servers 150 according to the information provided by CDS system 130. The download manager 112, 212, 312 will supply any necessary authentication codes to the download servers 150 to gain access to the selected software and proceed to download the software (blocks 422, 424). The selected software will then be installed to the hardware unit 110, 210, 320 by the download manager 112, 212, 312 providing any necessary authentication codes to activate or otherwise enable the software (block 425), preferably without needing to involve the user.

If an operating system (OS) is one of the software items to be downloaded, typically it will be the first item added to the hardware unit. Once the operating system files are downloaded to the hardware unit and installed, the download manager 112, 212, 312 may be re-launched to finish downloading from other download servers or portals 150. The download manager 112, 212, 312 may be re-launched in one or more of the following ways. In one embodiment, the full-OS build may have a startup executable application that is programmed to look for the download manager 112, 212, 312 during the initial boot sequence. If the download manager 112, 212, 312 is found, it will be triggered during the boot sequence of the operating system.

In an alternative embodiment, the download manager 112, 212, 312 may continue to run at startup of the hardware unit before the full OS loads. The files for the additional applications may be downloaded under supervision and control of the download manager 112, 212, 312 and an installation executable could be left for the OS startup to launch.

The CDS 130 may poll the download manager 112, 212, 312 to determine the status of the download. The download manager 112, 212, 312 may also contact CDS 130 if it encounters a problem. For example, if there is a problem downloading software from a particular vendor server 150, CDS 130 may redirect download manager 112, 212, 312 to an alternative site if one is available or suggest other actions, as appropriate.

After successfully completing the download and installation of the selected software, the download manager 112, 212, 312 will notify the CDS system 130 that the transaction was successful (block 426) and may also provide additional data concerning the software obtained such as serial numbers, versions, checksums, release dates, and the like. The CDS system 130 may then update the transaction record 142 to reflect downloads that were successful and record any additional data (block 428). Download manager 112, 212, 312 may also be reconfigured (block 430) to provide, for example, for future downloads of software patches and updates for the selected software. In some embodiments, confirmation of a successful download may also be provided by the CDS 130 to software vendors or to other systems and processes. The transaction record 142 will preferably be maintained in the central database 140 to facilitate software updates. For example, download manager 112, 212, 312 may be configured to query CDS 130 from time to time to compile a list of authentication codes and addresses to download and install new releases software patches and updates of the selected software.

Software downloads may not always be fully successful. A reasonable number of attempts will be made to install the selected software. However, if repeated failures are encountered and one or more software products or services can not be downloaded and/or successfully installed, download manager 112, 212, 312 will attempt to diagnose the problem and notify the CDS system 130 accordingly. The download manager may then instruct the user to take appropriate further action such as to call a technician for assistance (block 432).

CONCLUSION

As has been shown, embodiments of the present invention provide a system and method to download and install substantially up to date versions of selected software from a plurality of software vendors over a network and installing the software to a hardware unit.

A number of embodiments of the invention defined by the following claims have been described. Nevertheless, it will be understood that various modifications to the described embodiments may be made without departing from the spirit and scope of the claimed invention. For example, a variety of different system topographies and configurations may be employed and one or more operations may be performed in different orders in alternative embodiments.

What is claimed is:

1. A method for downloading up-to-date versions of selected software from a plurality of software vendors over a network and for installing the up-to-date versions of selected of software to a hardware unit, the network comprising a first software handling machine configured to execute a download manager, a second software handling machine configured to execute a download supervisor and a plurality of download servers for downloading the up-to-date versions of selected software from the plurality of software vendors, the method comprising:

associating, by said download manager, a transaction identifier of the hardware unit with selection data indicating the selected software for which said up-to-date versions of selected of software are to be downloaded to the hardware unit, wherein the selected software includes software that were pre-configured into the hardware unit at or before the time of sale of the hardware unit; and further wherein the transaction identifier identifies the hardware unit;

recording, by said download supervisor, said transaction identifier of the hardware unit and said associated selection data in a central database operatively connected to the second software handling machine;

sending a download transaction request comprising the transaction identifier of the hardware unit from the download manager to the download supervisor of the second software handling machine;

determining, by the download supervisor of the second software handling machine, the selection data for the hardware unit by looking up the transaction identifier of the hardware unit in the central database; and responsive to determining, by the download supervisor of the second software handling machine, that the requested download transaction is authorized, performing the steps of:

assembling, by the download supervisor of the second software handling machine, a download/installation instruction comprising up-to-date software access information for the selected software indicated by said selection data, wherein said software access information comprises a plurality of authentication codes for activating or downloading said up-to-date versions of selected software from the plurality of software vendors to the hardware unit, the authentication code provided by an authentication subsystem of said download supervisor of the second software handling machine;

communicating the download/installation instruction from the download supervisor of the second software handling machine to the download manager; and performing, by the download manager, a download and installation of the up-to-date versions of selected software from the plurality of software vendors to the hardware unit pursuant to the download/installation instruction, wherein the first software handling machine linked to the hardware unit by an external bus, and wherein the download manager executes upon detecting that the hardware unit is linked to the first software handling machine by said external bus.

2. The method of claim 1 wherein the transaction identifier comprises a serial number of the hardware unit.

3. The method of claim 2 wherein the software access information comprises a network address for at least one of said plurality of download servers.

4. The method of claim 1, wherein the download manager loads from a removable storage media.

5. The method of claim 1, wherein the first software handling machine comprises a personal computer.

6. The method of claim 1, wherein the download manager launches from the hardware unit.

7. The method of claim 6 wherein the download manager launches in a boot sequence of the hardware unit.

8. The method of claim 6 wherein the download manager sends a download transaction request comprising a predetermined selection of software.

9. The method of claim 1, wherein the hardware unit is linked to the first software handling machine by a dedicated communications link.

10. The method of claim 9, wherein the download manager executes upon detecting that the hardware on the dedicated communications link.

11. The method of claim 10, wherein the hardware unit is linked to the first software handling machine over a network comprising a local area network.

12. The method of claim 10, wherein the network comprises the Internet.

13. The method of claim 1 wherein data comprising the transaction identifier is encrypted.

14. The method of claim 1 wherein the selection data is determined in whole or in part in an interactive process.

15. The method of claim 14 further comprising obtaining the selection data by a point of sale application.

16. The method of claim 15 wherein obtaining the selection data by a point of sale application comprises providing an automated kiosk for selecting software and recording the selections for a download transaction.

17. The method of claim 1 wherein determining whether the download transaction is authorized comprises evaluating the transaction identifier.

18. The method of claim 1 further comprising interrogating the hardware unit to obtain information regarding the software that were pre-configured into the hardware unit at or before the time of sale of the hardware unit.

19. The method of claim 18 wherein interrogating the hardware unit to obtain information comprising preexisting software comprises executing a Desktop Management Interface.

20. The method of claim 18 further comprising modifying the selection data in response to the information comprising preexisting software.

21. The method of claim 1 wherein the software access information comprises a plurality of authentication codes for activating or downloading said up-to-date versions of selected software from said plurality of software vendors.

22. The method of claim 21, wherein the authentication codes are provided by an authentication subsystem of the download supervisor of the second software handling machine.

23. The method of claim 1 further comprising storing download transaction data to the central database.

24. The method of claim 23 wherein the download transaction data comprises a download transaction status.

25. The method of claim 23 wherein the download transaction status comprises a transaction hold status.

26. The method of claim 25 wherein communicating a download/installation instruction from the download supervisor of the second software handling machine to the download manager is held in abeyance while a transaction is in a hold status.

27. The method of claim 1 wherein the software is data comprising music, images, and video.

28. The method of claim 1 wherein the software is data comprising data related to services.

29. A system for downloading software to a hardware unit from a plurality of software vendors over a network, the system comprising:

a plurality of software vendor download servers in the network for providing up-to-date versions of selected software from the plurality of software vendors;

a first software handling machine in the network and linked to the hardware unit, the first software handling machine executing a download manager, the download manager initiating a download/installation transaction comprising selected software to be downloaded to the hardware unit from one or more of the plurality of download servers, sending a transaction identifier of the hardware unit in a download transaction request to a download supervisor of a second software handling machine over the network, and downloading and installing the selected software from the plurality of software vendors to the hardware unit pursuant to a download/installation instruction received in response to the download transaction request, said selected software being determined at the time of sale of the hardware unit, wherein said transaction identifier of the hardware unit are associated with selection data indicating said selected software of which said up-to-date versions of selected software to be downloaded to the hardware unit, wherein the transaction identifier identifies the hardware unit;

the second software handling machine in the network executing the download supervisor, the download supervisor determining whether the download transaction request is authorized, and, in response to determining by the download supervisor that the transaction is authorized by looking up the transaction identifier of the hardware unit in the central database, assembling a download/installation instruction comprising up-to-date software access information for the selected software indicated by said selection data, wherein said software access information comprises a plurality of authentication codes for activating or downloading said up-to-date versions of selected software from the plurality of software vendors to the hardware unit, the authentication code provided by an authentication subsystem of said download supervisor of the second software handling machine, and to send the download/installation instruction to the download manager;

a central database operatively connected to the second software handling machine, the download supervisor record said transaction identifier of the hardware unit and said associated selection data into the central database; and wherein the first software handling machine linked to the hardware unit by an external bus, and wherein the download manager executes upon detecting that the hardware unit is linked to the first software handling machine by said external bus.

30. The system of claim 29 wherein the software access information comprises a plurality of authentication codes for a plurality of encryption methods to download from said plurality of download servers.

31. The system of claim 29, wherein the download manager executes on the hardware unit.

32. The system of claim 29, wherein the software access information comprises a plurality of authentication codes to activate for activating software and a network address for downloading software from the plurality of download servers.

33. The system of claim 29 wherein the software is data comprising music, images, and video.

34. The system of claim 29 wherein the software is data comprising data related to services.

35. The system of claim 29, further comprising an automated kiosk running a point of sale application for allowing a user to select said software at the time of sale of the hardware unit, and recording said software selections to said first software handling machine.

36. A method for downloading up-to-date versions of selected software from a plurality of software vendors over a network and for installing the up-to-date versions of selected software to a hardware unit, the network comprising a first software handling machine configured to execute a download manager, a second software handling machine configured to execute a download supervisor and a plurality of download servers for downloading the up-to-date versions of selected software from the plurality of software vendors, the method comprising:

associating, by said download manager, a transaction identifier of the hardware unit with selection data indicating the selected software for which said up-to-date versions of selected software are to be downloaded to the hardware unit, wherein the selected software includes software that were pre-configured into the hardware unit at or before the time of sale of the hardware unit, and further wherein the transaction identifier identifies the hardware unit;

sending a download transaction request comprising the transaction identifier of the hardware unit from the download manager to the download supervisor of the second software handling machine;

recording, by said download supervisor, said transaction identifier of the hardware unit and said associated selection data in a central database operatively connected to the second software handling machine;

determining, by the download supervisor of the second software handling machine, the selection data for the hardware unit by looking up the transaction identifier of the software unit under central database;

responsive to determining, by the download supervisor of the second software handling machine, that the requested download transaction is authorized, performing the steps of:

assembling, by the download supervisor of the second software handling machine, a download/installation instruction comprising up-to-date software access information for the selected software indicated by said selection data, wherein said software access information comprises a plurality of authentication codes for activating or downloading said up-to-date versions of selected software from the plurality of software vendors to the hardware unit, the authentication codes provided by an authentication subsystem of said download supervisor of the second software handling machine;

communicating the download/installation instruction from the download supervisor of the second software handling machine to the download manager; and performing, by the download manager, a download and installation of the up-to-date versions of selected software from the plurality of software vendors to the hardware unit pursuant to the download/installation; and wherein the first software handling machine linked to the hardware unit by an external bus, and wherein the download manager executes upon detecting that the hardware unit is linked to the first software handling machine by said external bus.

37. A method for downloading up-to-date versions of selected software from a plurality of software vendors over a network and for installing the up-to-date versions of selected software to a hardware unit, the network comprising a first software handling machine including a point of sale application and configured to execute a download manager, a second software handling machine configured to execute a download supervisor and a plurality of download servers for downloading the up-to-date versions of selected software from the plurality of software vendors, the method comprising:

associating, by said download manager, a transaction identifier of the hardware unit with selection data indicating the selected software for which said up-to-date versions of selected software are to be downloaded to the hardware unit, wherein the selected software includes software that were pre-configured into the hardware unit at or before the time of sale of the hardware unit, and further wherein the transaction identifier identifies the hardware unit;

recording, by said download supervisor, said transaction identifier of the hardware unit and said associated selection data in a central database operatively connected to the second software handling machine;

sending a download transaction request comprising the transaction identifier of the hardware unit from the download manager to the download supervisor of the second software handling machine;

determining, by the point of sale application of the first software handling machine, the selection data for the hardware unit by looking up the transaction identifier of the hardware unit in the central database; and responsive to determining, by the download supervisor of the second software handling machine, that the requested download transaction is authorized, performing the steps of:

assembling, by the download supervisor of the second software handling machine, a download/installation instruction comprising up-to-date software access information for the selected software indicated by said selection data, wherein said software access information comprises a plurality of authentication codes for activating or downloading said up-to-date versions of selected software from the plurality of software vendors to the hardware unit, the authentication codes provided by an authentication subsystem of said download supervisor of the second software handling machine;

communicating the download/installation instruction from the download supervisor of the second software handling machine to the download manager; and performing, by the download manager, a download and installation of the up-to-date versions of selected software from the plurality of software vendors to the hardware unit pursuant to the download/installation instruction, and wherein the first software handling machine linked to the hardware unit by an external bus, and wherein the download manager executes upon detecting that the hardware unit is linked to the first software handling machine by said external bus.

* * * * *